(12) United States Patent
Dong et al.

(10) Patent No.: US 6,380,937 B1
(45) Date of Patent: Apr. 30, 2002

(54) METHOD AND SYSTEM FOR DYNAMICALLY REPRESENTING CLUSTER ANALYSIS RESULTS

(75) Inventors: Jianming Dong; Shirley Lynn Martin; Paul David Waldo, all of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/433,293

(22) Filed: Nov. 3, 1999

(51) Int. Cl.[7] .................. G06T 11/20; G06F 17/00; G06F 17/30; G06F 3/00
(52) U.S. Cl. ............... 345/440; 345/853; 345/854; 345/855; 707/6; 707/100
(58) Field of Search ............... 345/853–855, 345/440, 700–867; 707/6, 100, 526

(56) References Cited

U.S. PATENT DOCUMENTS

| | | | | |
|---|---|---|---|---|
| 5,263,120 A | * | 11/1993 | Bickel | 706/62 |
| 5,544,256 A | * | 8/1996 | Brecher et al. | 382/149 |
| 5,877,775 A | * | 3/1999 | Thiesen et al. | 345/440 |
| 6,083,276 A | * | 7/2000 | Davidson et al. | 717/1 |
| 6,100,901 A | * | 8/2000 | Mohda et al. | 345/440 |
| 6,226,408 B1 | * | 5/2001 | Sirosh | 382/224 |

* cited by examiner

Primary Examiner—Jeffery Brier
Assistant Examiner—Anthony J. Blackman
(74) Attorney, Agent, or Firm—Leslie A. Van Leeuwen; Bracewell & Patterson, L.L.P.

(57) ABSTRACT

A method and system for dynamically representing cluster analysis results. In accordance with the method and system of the present invention, a hierarchical tree is graphically displayed. The hierarchical tree represents cluster analysis of relationships between multiple items utilizing an initial distance constraint value, wherein the graphical display includes a graphically alterable threshold indicator positioned within the hierarchical tree that graphically marks the distance constraint value. The presentation of the graphical display of the hierarchical tree is dynamically altered to reflect a user-determined distance constraint value, in response to user-controlled alteration of the graphical position of the threshold indicator, such that upon changing a distance constraint for a cluster analysis, the hierarchical tree which graphically represents the cluster analysis is dynamically altered.

41 Claims, 6 Drawing Sheets

METHOD AND SYSTEM FOR DYNAMICALLY REPRESENTING CLUSTER ANALYSIS RESULTS

BACKGROUND OF THE INVENTION

1. Technical Field

The present invention relates in general to a method and system for graphically displaying data and, in particular, to a method and system for dynamically representing cluster analysis results. Still more particularly, the present invention relates to a method and system for dynamically altering a hierarchical tree which represents the cluster analysis results, in response to a graphical selection of a distance constraint value.

2. Description of the Prior Art

A general question facing researchers in many area of inquiry is how to organize observed data into meaningful structures, that is, to develop taxonomies. For example, web page designers typically determine a hierarchy of site pages where a primary page or "home page" has multiple topics from which the user may select. To increase usability of the site, the designer preferably attempts to organize the pages in a manner which is intuitive to people who will utilize the web site.

One method of determining how users intuitively view relationships between various topics, like those of multiple site pages, is through card sorting. For card sorting, a user views multiple cards, each of which contains a topic. The user then groups the cards according to how closely the user finds the topics to be related. Preferably, a large sampling group of users each perform a card sort. The results of the card sorting are then analyzed, typically utilizing cluster analysis, as is well known in the art.

In general, cluster analysis is a "collection" of different algorithms that organize objects into clusters and is an efficient tool for analyzing the relationships of a variety of objects. General categories of cluster analysis methods include joining (tree clustering), two-way joining (block clustering) and k-means clustering.

Joining is the most commonly utilized cluster analysis methodology. In joining, the results of cluster analysis are plotted on a static hierarchical tree as is well known in the art. In particular, software which plots a static hierarchical tree typically requires the user to enter a matrix of relationship data which represents the results of a card sort or other data collection research. The software plots a static hierarchical tree representing the data entered by the user.

In particular, current computer automated methods of plotting a static hierarchical tree limit the effectiveness of interpreting cluster analysis. However, permitting the user to interact with the plotted data to adjust the criterion for groups and sub groups from the hierarchical tree would enhance the effectiveness of cluster analysis result output. Further, providing graphical distinctions between clusters would further enhance the effectiveness of cluster analysis result output. In particular, the increase in effectiveness representing cluster analysis results would provide an improved method for translating users' mental models of relationships between topics to an organizational model for a web site.

SUMMARY OF THE INVENTION

In view of the foregoing, it is therefore an object of the present invention to provide an improved method and system for graphically displaying data.

It is another object of the present invention to provide an improved method and system for dynamically representing cluster analysis results.

It is yet another object of the present invention to provide an improved method and system for dynamically altering a hierarchical tree that represents cluster analysis results, in response to a graphical selection of a distance constraint value.

In accordance with the method and system of the present invention, a hierarchical tree is graphically displayed. The hierarchical tree represents cluster analysis of relationships between multiple items utilizing an initial distance constraint value, wherein the graphical display includes a graphically alterable threshold indicator positioned within the hierarchical tree that graphically marks the initial distance constraint value. The presentation of the graphical display of the hierarchical tree is dynamically altered to reflect a user-determined distance constraint value, in response to user-controlled alteration of the graphical position of the threshold indicator, such that upon changing a distance constraint for a cluster analysis, the hierarchical tree which graphically represents the cluster analysis is dynamically altered.

All objects, features, and advantages of the present invention will become apparent in the following detailed written description.

DESCRIPTION OF THE DRAWINGS

The invention itself, as well as a preferred mode of use, further objects and advantages thereof, will best be understood by reference to the following detailed description of an illustrative embodiment when read in conjunction with the accompanying drawings, wherein.

DESCRIPTION OF A PREFERRED EMBODIMENT

The present invention may be executed in a variety of computers under a number of different operating systems. The computer may be, for example, a personal computer, a midrange computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a personal computer, such as the Aptiva series manufactured by International Business Machines Corporation.

Figure 1:
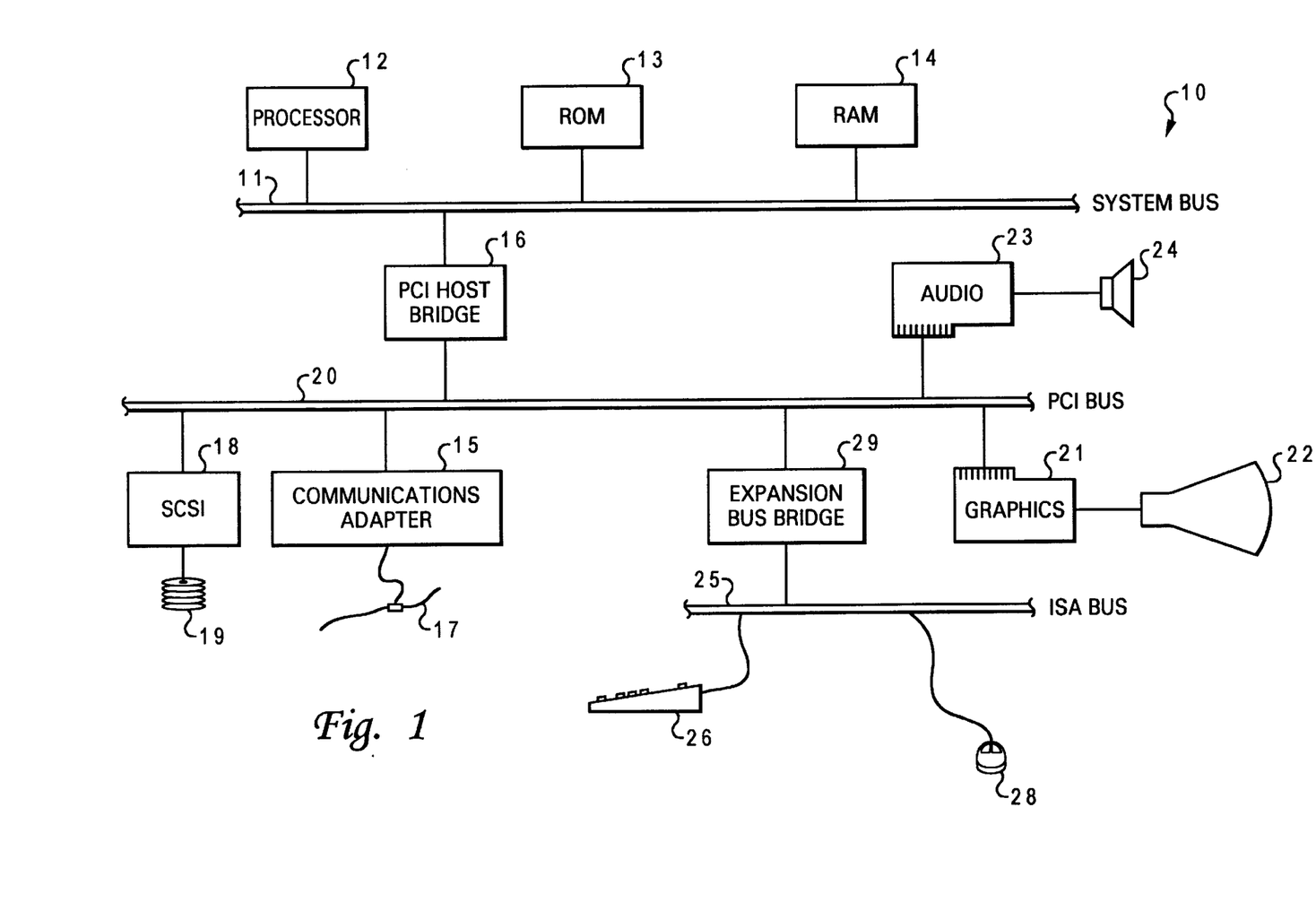
FIG. 1 is a block diagram of a typical computer system which may be utilized to implement a preferred embodiment of the present invention.

Referring now to the drawings and in particular to FIG. 1, there is depicted a block diagram of a typical computer system that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

Also attaching to PCI local bus 20 are communications adapter 15, small computer system interface (SCSI) 18, and expansion bus bridge 45. Communications adapter 15 is for connecting computer system 10 to a network 17. SCSI 18 is utilized to control high-speed SCSI disk drive 19. Expansion bus bridge 45, such as a PCI-to-ISA bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22.

Computer system 10 also preferably includes an interface such as a graphical user interface (GUI) and an operating system (OS) that reside within machine-readable media to direct the operation of computer system 10. Any suitable machine-readable media may retain the GUI and OS, such as RAM 14, ROM 13, SCSI disk drive 19, and other disk and/or tape drive (e.g. magnetic diskette, magnetic tape, CD-ROM, optical disk, or other suitable storage media). In the present embodiment, any suitable graphical user interface (GUI) and operating system (OS) may direct CPU 12. For example, the AIX operating system is one of IBM's operating systems that may be implemented.

Further, computer system 10 preferably includes at least one software application (e.g. program product) that resides within machine-readable media. A software application contains instructions that when executed on CPU 12 carry out the operations depicted in the flow chart of FIG. 6 and others described herein.

Figure 2:
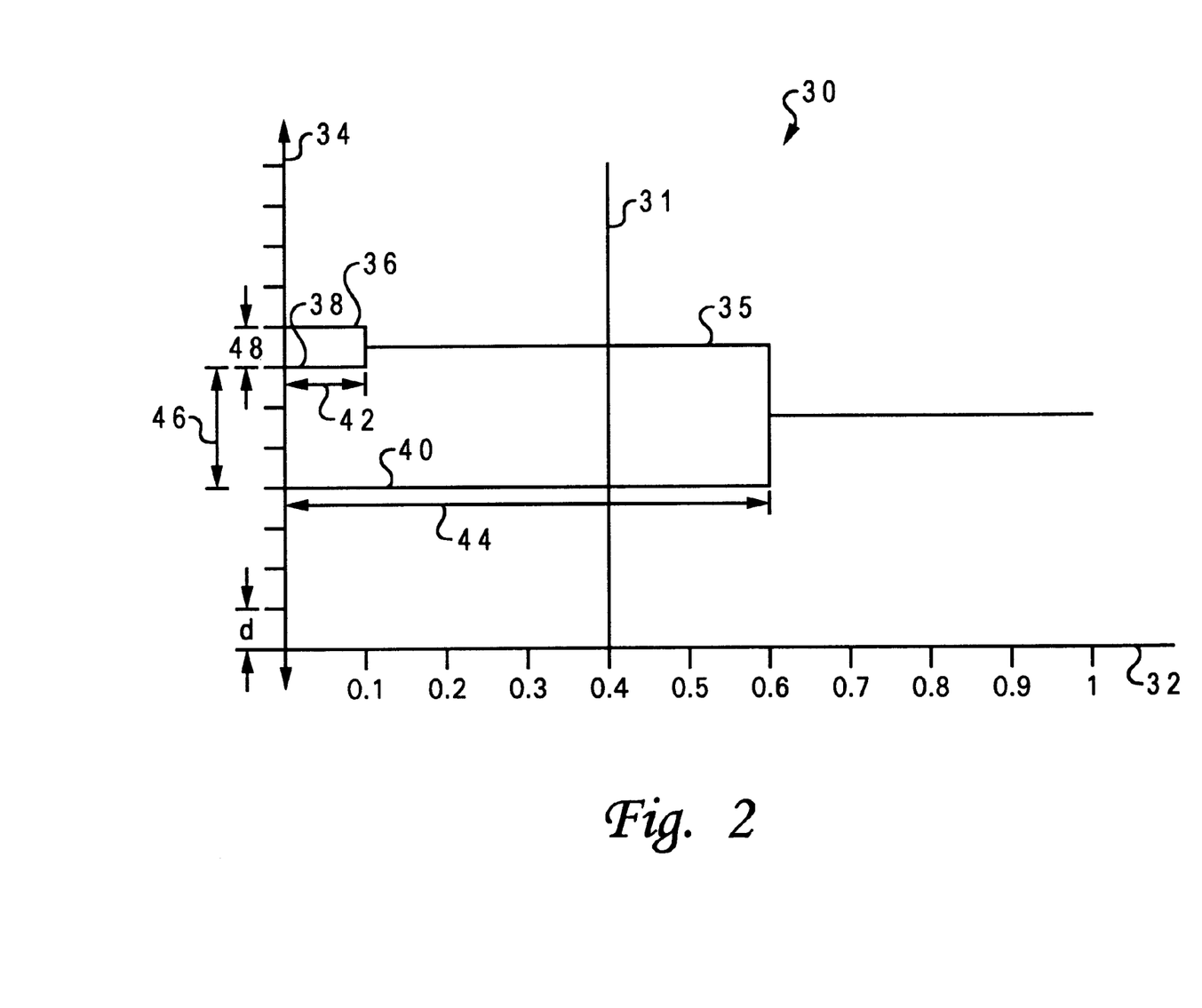
FIG. 2 is a block diagram of a graph illustrating how relationships between items are displayed horizontally and vertically on a hierarchical tree in accordance with the method and system of the present invention.

Referring now to FIG. 2, there is illustrated a block diagram of a graph illustrating how relationships between items are displayed horizontally and vertically on a hierarchical tree in accordance with the method and system of the present invention. In particular, both a horizontal scale 32 and a vertical scale 34 depict the relationships between each element illustrated in graph 30. Horizontal scale 32 illustrates the distance score calculated for each pair of items and is preferably a scale of numerical values from 0 to 1. Vertical scale 34 depicts groupings of items with respect to the graphical position of a threshold indicator 31. Vertical scale 34 may be divided into multiple sections, where each spacing unit is a distance d. The graphical position of threshold indicator 31 represents a distance constraint value of a particular distance score on horizontal scale 32. For each point at which threshold indicator 31 intersects hierarchical tree connectors 35 at a particular distance score, a group is created to the left of threshold indicator 31. To distinguish between groups, each group of elements is spatially separated from each other group of elements on vertical scale 34 by a distinguishable separation. In addition, each element in a group is closely distanced on vertical scale 34. In particular, while a single threshold indicator 31 is depicted, in alternate embodiments, any multiple of threshold indicators may be graphically displayed where for each point at which a threshold indicator intersects the hierarchical tree connectors, a group is created to the left of the threshold indicator. When multiple threshold indicators are utilized, subgroups of groups will be created.

For the example illustrated, elements 36, 38 and 40 comprise a hierarchical tree by connectors 35 between elements. Elements 36 and 38 are closely related by a distance score of 0.1 on horizontal scale 32 as depicted at reference numeral 42. Element 40 relates to elements 36 and 38 by a distance score of 0.6 on the horizontal scale as depicted at reference numeral 44. Threshold indicator 31 is located at a distance constraint value of 0.4 on horizontal scale 32. Therefore, threshold indicator 31 intersects with connectors 35 at two points and thereby creates two groups of elements, where elements 36 and 38 comprise a first group and element 40 comprises a second group. As depicted, elements 36 and 38 are vertically separated by a minimal distance 48 of one vertical spacing unit since the elements are within a single group. Element 40 is vertically separated from elements 36 and 38 by a distinguishable separation 46 of three vertical spacing units. Thereby, the groups formed by setting threshold indicator 31 at a particular graphical location are depicted such that a user may more easily distinguish between groups.

In the example depicted in FIG. 2, by moving graphical threshold indicator 31 to different distance constraint values, the number of groups resultant at varying distance constraint values may be determined. For example, if threshold indicator 31 is repositioned at a distance constraint value of 0.7, then only one group is distinguished which contains elements 36, 38 and 40. In this case, each adjacent element of elements 36, 38 and 40 would preferably be separated by one vertical spacing unit. Alternatively, if threshold indicator is repositioned at a distance constraint value of 0.05, then three groups are distinguished where a first group contains element 36, a second group contains element 38 and a third group contains element 40. In this case, each adjacent element of elements 36, 38 and 40 would preferably be vertically separated by a distance greater than one vertical spacing unit.

Referring still to the example illustrated in FIG. 2, relationships between elements 36, 38 and 40 may be indicated according to a card sort procedure which is well known in the art. For example, each of elements 36, 38 and 40 may be depicted on cards. Multiple testers look at the cards and determine how the cards are related. One tester might group cards representing elements 36 and 38. Another tester might group cards representing elements 38 and 40. Another tester might group cards representing elements 36, 38 and 40. Those grouping data are then calculated into a matrix which represents the frequency at which each element is grouped with each of the other elements. The distance score is then calculated as an indicator of how closely related each pair of the elements has been perceived to be, as is well known in the art.

Figure 3:
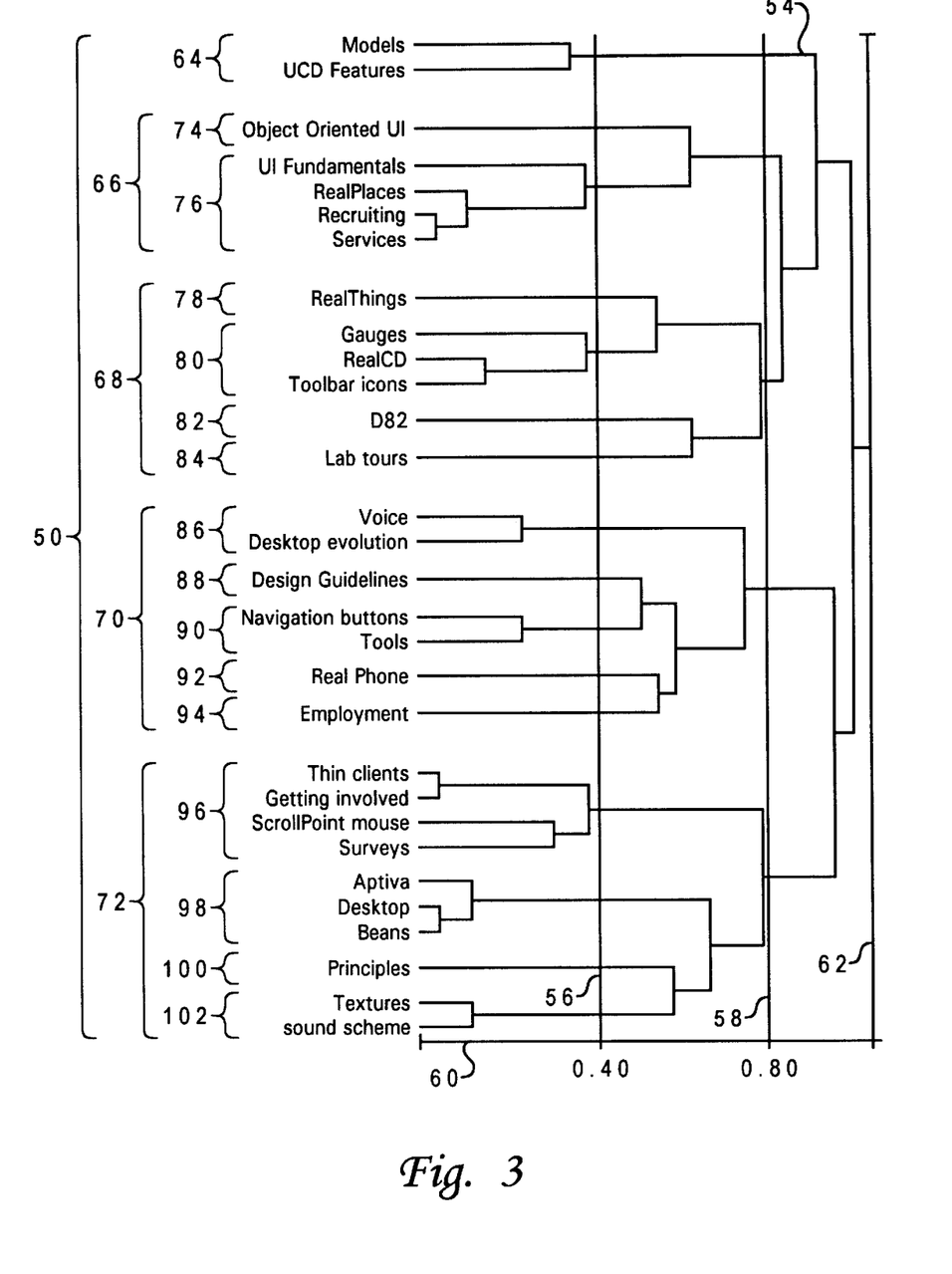
FIG. 3 is a pictorial illustration of a graphically displayed hierarchical tree according to the method and system of the present invention.

With reference now to FIG. 3, there is depicted a pictorial illustration of a graphically displayed hierarchical tree according to the method and system of the present invention. In the example of FIG. 3, multiple elements 50 are illustrated connected by hierarchical tree connectors 54 within a graphical display window 52. As described in FIG. 2, each of elements 50 is graphically connected to illustrate calculated relationship distances on a horizontal scale 60, and spatially distanced along a vertical scale 62 to illustrate relative distances between groups of elements. In addition, two graphical threshold indicators 56 and 58 are depicted along horizontal scale 60. Arbitrarily, threshold indicator 56 is set at a distance constraint value of 0.40 and threshold indicator 58 is set at a distance constraint value of 0.80.

Upper threshold indicator 58 is utilized to identify groups of elements from elements 50 which are placed together at a particular distance constraint value which is 0.80 in the present example. Each group is determined by the points at which upper threshold indicator 58 crosses hierarchical connectors 54. With upper threshold indicator 58 at 0.80 on the horizontal scale, upper threshold indicator 58 crosses five hierarchical connectors. Thereby, five groups of elements are achieved, as depicted at reference numerals 64, 66, 68, 70 and 72, where each reference numeral represents a separate group. It is preferable to provide graphical illustration to further delineate each group. For example, two distinguishable solid color shaded areas may be utilized alternatively as backgrounds for each group. By this method, when the group depicted at reference numeral 64 is undershaded with a first distinguishable solid color, then the group illustrated at reference numeral 66 is undershaded with a second distinguishable solid color, and so forth, alternating from group to group.

Lower threshold indicator 56 is utilized to identify subgroups of elements from the groups of elements illustrated at reference numeral 64, 66, 68, 70 and 72. Each subgroup is determined by the points at which lower threshold indicator 56 crosses hierarchical connectors 54. In the example, the group of elements illustrated at reference numeral 64 is also a subgroup. The group of elements depicted at reference numeral 66 includes subgroups depicted by reference numerals 74 and 76. The group of elements illustrated at reference numeral 68 includes subgroups illustrated by reference numerals 78, 80, 82 and 84. The group of elements depicted at reference numeral 70 includes subgroups depicted at reference numerals 86, 88, 90, 92 and 94. The group of elements illustrated at reference numeral 72 includes subgroups depicted at reference numerals 96, 98, 100 and 102.

For the example, it is preferable to provide graphical illustration to further delineate each subgroup. For example, a color shading of the element names and hierarchical connectors included in each subgroup may be applied where two distinguishable colors are alternated for adjacent subgroups. Preferably, the hierarchical connectors are displayed in a color only up to lower threshold indicator 56, and thereon are displayed in black. For example, the subgroup indicted at reference numeral 74 includes element name "Object Oriented UI" which may be displayed with a first distinguishable color as well as the hierarchical connector 54 from the element name. Adjacent to the subgroup indicated at reference numeral 74 are the subgroups indicated at reference numeral 64 and 68. The element names and hierarchical connectors of each of these subgroups may be displayed in a second distinguishable color.

Figure 4:
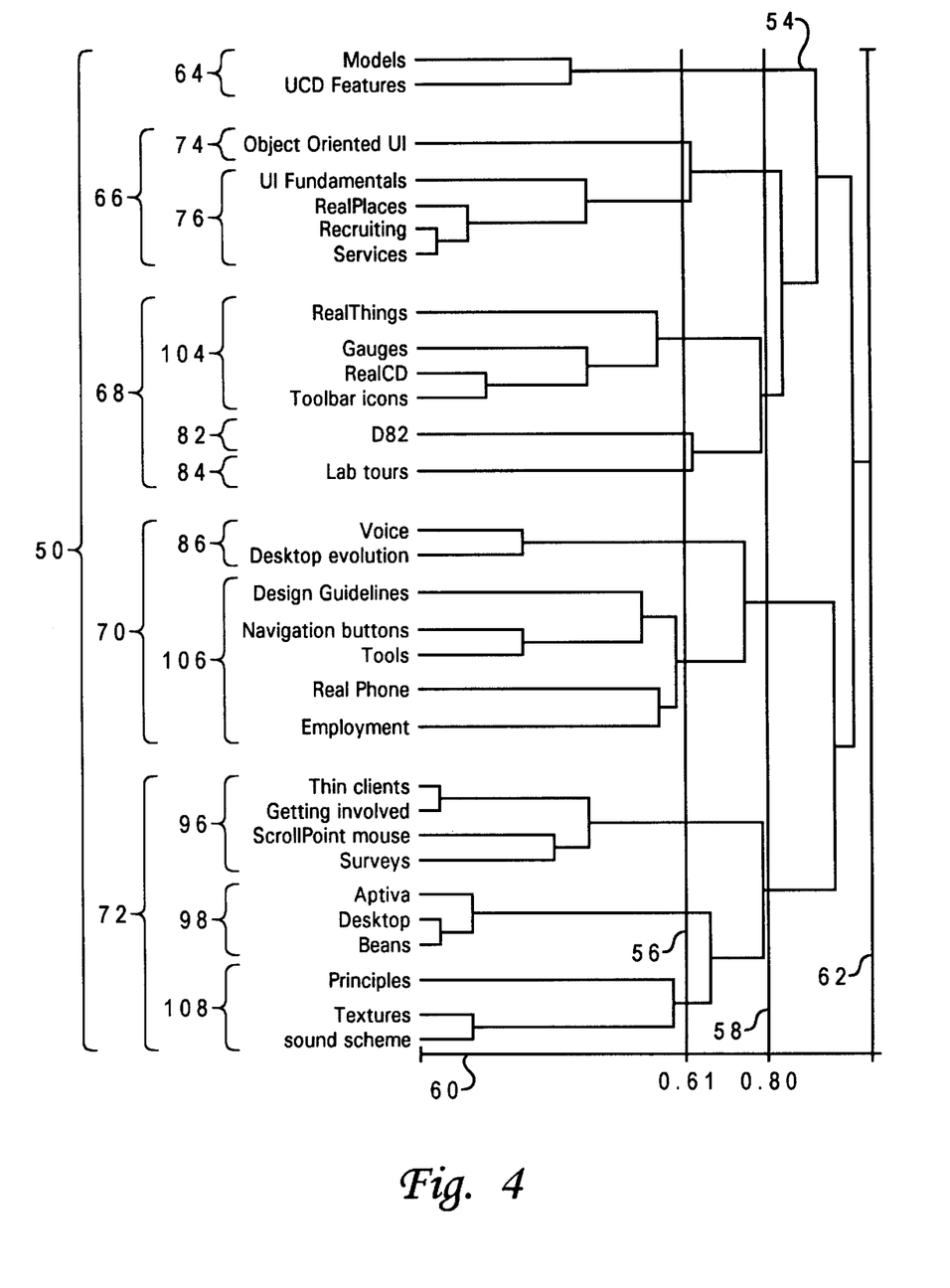
FIG. 4 is a pictorial illustration of a graphically displayed hierarchical tree which has been dynamically altered to reflect a user-determined distance constraint value.

Referring now to FIG. 4, there is illustrated a pictorial illustration of a graphically displayed hierarchical tree that has been dynamically altered to reflect a user-determined distance constraint value. In o the example depicted, as compared with FIG. 3, lower threshold indicator 56 has been graphically repositioned to a user-determined distance constraint value of 0.61. As lower threshold indicator 56 is repositioned, the composition of some subgroups which were depicted in FIG. 3 changes. In particular, while the vertical hierarchical connections displayed are not affected along the horizontal scale, elements 50 and the horizontal hierarchical connections 54 are redistributed along the vertical scale to reflect changes in relationships between recomposed subgroups. Elements that are contained in a subgroup are positioned close together and each subgroup is spaced at a distance from other subgroups.

With reference to the example depicted in FIG. 4, the subgroups indicated by reference numerals 78 and 80 in FIG. 3 are now a single subgroup indicated by reference numeral 104, whereby the vertical distance between the elements in the subgroup indicated by reference numeral 104 is equal, however the vertical distance between elements in the subgroup indicated by reference numeral 104 and the subgroup indicated by reference numeral 82 is distinguishably larger. The subgroups indicated by reference numerals 90, 92 and 94 in FIG. 3 are now a single subgroup indicated by reference numeral 106. Further, the subgroups indicated by reference numerals 100 and 102 in FIG. 3 are now a single subgroup indicated by reference numeral 106. In addition to the composition of subgroups changing, the color displays of each subgroup change to alternate for adjacent subgroups.

Figure 5:
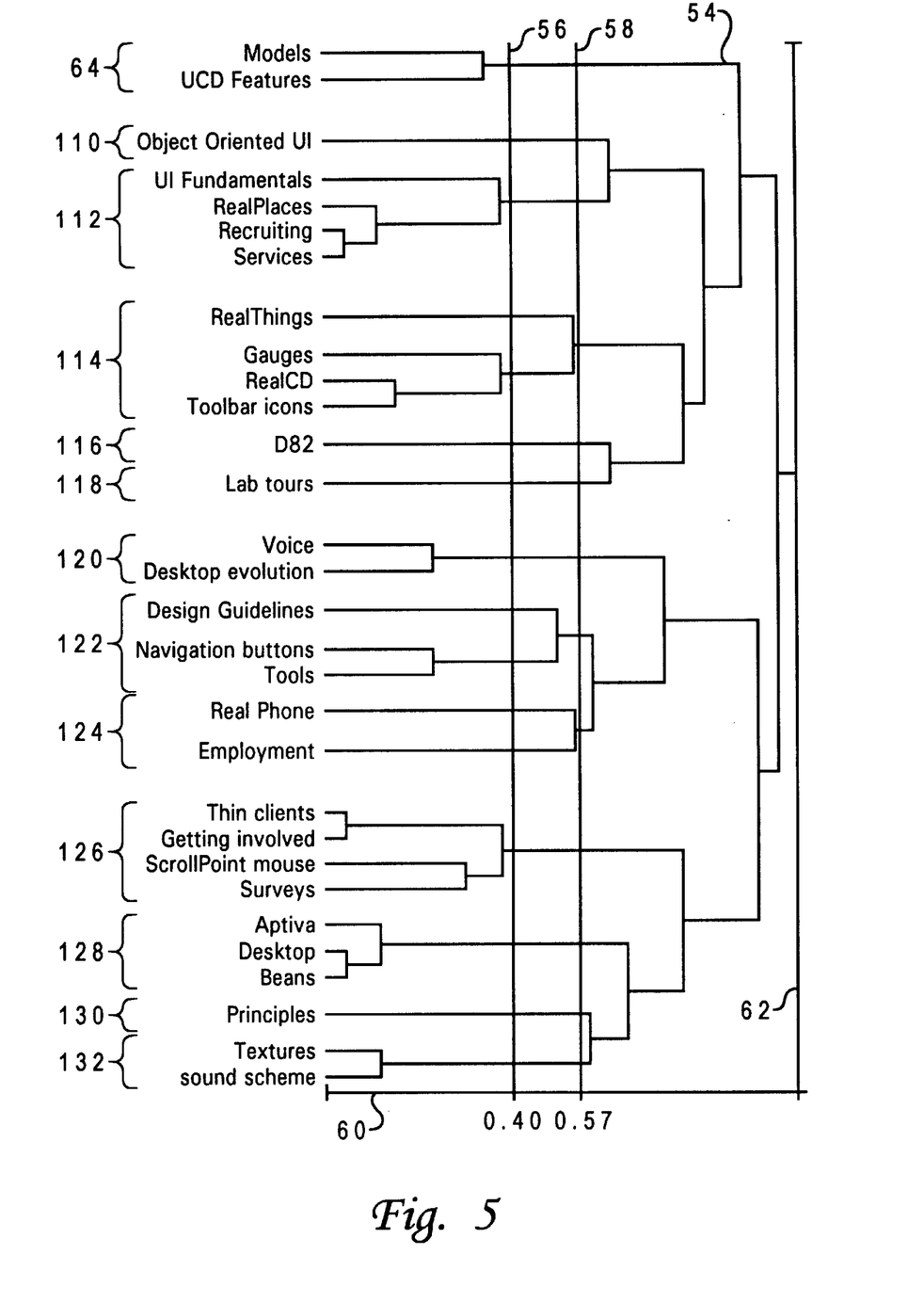
FIG. 5 is a pictorial illustration of a graphically displayed hierarchical tree which has been dynamically altered to reflect a second user-determined distance constraint value.

With reference now to FIG. 5, there is depicted a pictorial illustration of a graphically displayed hierarchical tree which has been dynamically altered to reflect a second user-determined distance constraint value. In the example depicted, as compared with FIG. 3, upper threshold indicator 58 has been graphically repositioned to a second user-determined distance constraint value of 0.57. As upper threshold indicator 58 is repositioned, the composition of some groups which were depicted in FIG. 3 changes. In particular, while in FIG. 3 five hierarchical connectors are crossed by upper threshold indicator 58, in FIG. 5 thirteen hierarchical connectors are crossed by upper threshold indicator 58.

Further, in particular, elements that are within a single group are positioned close together and each group is spaced at a distance from other groups. The subgroups within each group may be also vertically spaced at a distance from each other. For example, the group indicated by reference numeral 64 remains a group. However, the group indicated by reference numeral 66 in FIG. 3 is now two groups indicated by reference numerals 110 and 112. The groups indicated by reference numerals 110 and 112 are spaced at a larger distance from each other than when in FIG. 3 each of the groups 110 and 112 were subgroups 74 and 76 of a group indicated by reference numeral 66. The group indicated by reference numeral 68 in FIG. 3 is now four groups indicated by reference numerals 112, 114, 116 and 118. The group indicated by reference numeral 70 in FIG. 3 is now three groups indicated by reference numerals 120, 122 and 124. The group indicated by reference numeral 72 in FIG. 3 is now four groups indicated by reference numerals 126, 128, 130 and 132.

In particular, utilizing the dynamic representation of cluster analysis as depicted in FIGS. 3–5 may be particularly useful when designing web page hierarchies. For example, if each of elements 50 represents a topic of a web page and a card sort has been performed by multiple users to determine how users view relationships between topics, then a dynamic representation of the card sort may be graphically displayed as a hierarchical tree, such as the display in FIGS. 3–5. Further, if for example the web page designer wants to display only five groups of topics on a primary web page, upper threshold indicator 58 may be repositioned until only five groups are selected to the left of upper threshold indicator 58 as in FIG. 3. However if the web page designer wants to display thirteen groups of topics on a primary web page, upper threshold indicator 58 may be repositioned until only thirteen groups are indicated to the left of upper threshold indicator 58 as in FIG. 5. In addition, while not depicted in FIGS. 3–5 other numbers of groups may also be achieved by repositioning upper threshold indicator 58.

After the web designer has positioned upper threshold indicator 58 to produce the preferred number of groups, the web designer may have preference about the maximum number of subgroups within a group. For example, if the designer wants only five groups, the upper threshold indicator may be set at a distance constraint value of 0.80 as depicted in FIGS. 3 and 4. However, if the designer wants no more than three subgroups within each group, lower threshold indicator 56 may be repositioned to a distance constraint value of 0.61 as illustrated in FIG. 4. Thereby, no more than three subgroups are contained within each of the five groups. In particular, the above methods may be utilized to provide the web page designer with an organizational model of the users' mental model of the degree to which particular topics of a multi-page web site are related.

Figure 6:
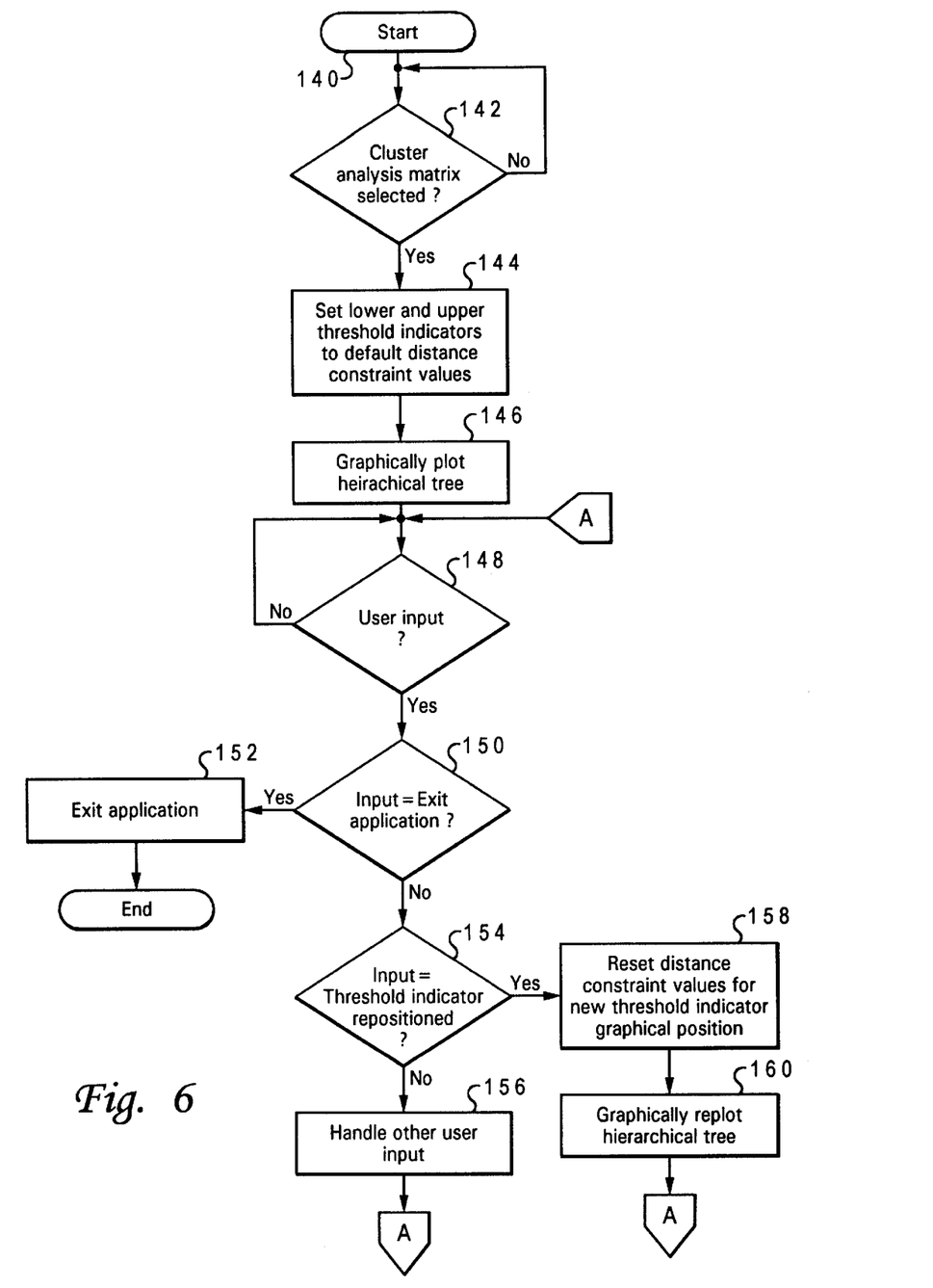
FIG. 6 is a high-level logic flowchart of a process for graphically displaying a hierarchical tree which graphically represents the results of cluster analysis.

Referring now to FIG. 6, there is illustrated a high-level logic flowchart of a process for graphically displaying a hierarchical tree which graphically represents the results of cluster analysis. As depicted, the process starts at block 140 and thereafter proceeds to block 142. Block 142 illustrates a determination as to whether or not a cluster analysis matrix has been selected. If a cluster analysis matrix has not been selected, the process iterates at block 142. If a cluster analysis matrix has been selected, the process passes to block 144.

Block 144 depicts setting lower and upper threshold indicators to default distance constraint value values. In an alternate embodiment, the user may enter distance constraint values which would be utilized as default distance constraint values. Thereafter, block 146 illustrates graphically plotting a hierarchical tree for the selected cluster analysis matrix where lower and upper threshold indicators are graphically plotted on said hierarchical tree at said default distance constraint values. Next, block 148 depicts a determination as to whether or not a user input has been detected. If a user input has not been detected, the process iterates at block 148. If a user input has been detected, the process passes to block 150.

Block 150 illustrates a determination as to whether or not the detected input is for exiting the application. If the detected input is for exiting the application, the process passes to block 152, exiting the application is depicted and the process ends. If the detected input is not for exiting the application, the process passes to block 154.

Block 154 illustrates a determination as to whether or not the input is from threshold indicator repositioning. If the input is not from threshold indicator repositioning, the process passes to block 156 where handling other user input is depicted and the process passes to block 148. If the input is from threshold indicator repositioning, the process passes to block 158.

Block 158 illustrates resetting the distance constraint values for new threshold indicator graphical positions. Thereafter, block 160 depicts graphically replotting the hierarchical tree utilizing the reset distance constraint values for the new threshold indicator graphical positions. Next, the process proceeds to block 148.

While in the present invention the user graphically repositions threshold indicators as depicted at block 158, in an alternate embodiment of the present invention the user may be prompted to enter the number of groups or subgroups desired whereby any relevant threshold indicators would be automatically repositioned to achieve the desired number of groups or subgroups. In addition, in alternate embodiments of the present invention, the user may be prompted to enter a numerical value to be utilized as a distance constraint value. Both processes require user input to alter distance constraint values and threshold indicators.

Further, while in the present embodiment, a particular tree structure has been displayed for a cluster analysis, it will be understood by one skilled in the art that other methods of displaying a cluster analysis may be utilized.

It is important to note that, although the present invention has been described in the context of a fully functional computer system, those skilled in the art will appreciate that mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for dynamically representing cluster analysis results, said method comprising the steps of:

graphically displaying a hierarchical tree representing cluster analysis of relationships between a plurality of items utilizing an initial distance constraint value, wherein said graphical display includes a graphically alterable threshold indicator positioned within said hierarchical tree that graphically marks said distance constraint value; and dynamically altering the presentation of said graphical display of said hierarchical tree to reflect a user-determined distance constraint value, in response to user-controlled alteration of said graphical position of said threshold indicator, such that upon changing a distance constraint value for a cluster analysis, said hierarchical tree which graphically represents said cluster analysis is dynamically altered.

2. The method for dynamically representing cluster analysis results according to claim 1, said step of graphically displaying a hierarchical tree, further comprising the step of:

graphically distinguishing each group of a plurality of groups designated from each point at which said threshold indicator intersects with said hierarchical tree.

3. The method for dynamically representing cluster analysis results according to claim 2, said step of graphically distinguishing each group of a plurality of groups designated from each point at which said threshold indicator intersects with said hierarchical tree, further comprising the step of:

graphically altering the background color of each of said plurality of groups such that graphically distinguishable background colors alternate between adjacent groups of said plurality of groups.

4. The method for dynamically representing cluster analysis results according to claim 2, said step of graphically distinguishing each group of a plurality of groups designated from each point at which said threshold indicator intersects with said hierarchical tree, further comprising the step of:

graphically adjusting the distance between groups of said items graphically displayed for each adjacent group of said plurality of groups.

5. The method for dynamically representing cluster analysis results according to claim 1, said step of graphically displaying a hierarchical tree, further comprising the step of:
  graphically displaying a hierarchical tree representing cluster analysis of relationships between a plurality of items utilizing a plurality of distance constraint values, wherein said graphical display includes a plurality of graphically alterable threshold indicators positioned within said hierarchical tree that graphically mark each of said plurality of distance constraint values.

6. The method for dynamically representing cluster analysis results according to claim 5, said step of graphically displaying a hierarchical tree, further comprising the steps of:
  graphically distinguishing each group of a plurality of groups designated from each point at which a first threshold indicator intersects with said hierarchical tree; and
  graphically distinguishing each subgroup of a plurality of subgroups designated from each point at which a subsequent threshold indicator intersects with said hierarchical tree.

7. The method for dynamically representing cluster analysis results according to claim 6, said steps of graphically distinguishing each group of a plurality of groups designated from each point at which a first threshold indicator intersects with said hierarchical tree and graphically distinguishing each subgroup of a plurality of subgroups designated from each point at which a subsequent threshold indicator intersects with said hierarchical tree, further comprising the steps of:
  graphically altering the background color of each of said plurality of groups such that graphically distinguishable background colors alternate between adjacent groups of said plurality of groups; and
  graphically altering the display color of each of said plurality of graphically displayed items such that graphically distinguishable display colors alternate between adjacent subgroups of said plurality of subgroups.

8. The method for dynamically representing cluster analysis results according to claim 6, said steps of graphically distinguishing each group of a plurality of groups designated from each point at which a first threshold indicator intersects with said hierarchical tree and graphically distinguishing each subgroup of a plurality of subgroups designated from each point at which a subsequent threshold indicator intersects with said hierarchical tree, further comprising the steps of:
  graphically adjusting the distance between said items graphically displayed for each adjacent group of said plurality of groups; and
  graphically adjusting the distance between said items graphical displayed for each adjacent subgroup of said plurality of subgroups.

9. The method for dynamically representing cluster analysis results according to claim 1, said step of graphically displaying a hierarchical tree, further comprising the step of:
  graphically displaying a hierarchical tree representing cluster analysis of relationships between a plurality of web page topics, such that said graphically displayed hierarchical tree represents a web page hierarchy.

10. The method for dynamically representing cluster analysis results according to claim 1, said step of dynamically altering the presentation of said graphical display of said hierarchical tree, further comprising the step of:
  graphically distinguishing each group of a plurality of groups designated from each point at which said graphically positioned threshold indicator intersects with said hierarchical tree for a user-determined distance constraint value.

11. The method for dynamically representing cluster analysis results according to claim 10, said step of graphically distinguishing each group of a plurality of groups designated from each point at which said graphically positioned threshold indicator intersects with said hierarchical tree for a user-determined distance constraint value, further comprising the step of:
  graphically altering the background color of each of said plurality of groups such that graphically distinguishable background colors alternate between adjacent groups of said plurality of groups.

12. The method for dynamically representing cluster analysis results according to claim 10, said step of graphically distinguishing each group of a plurality of groups designated from each point at which said graphically positioned threshold indicator intersects with said hierarchical tree for a user-determined distance constraint value, further comprising the step of:
  graphically adjusting the distance between said items graphically displayed for each adjacent group of said plurality of groups.

13. The method for dynamically representing cluster analysis results according to claim 1, said step of dynamically altering the presentation of said graphical display of said hierarchical tree, further comprising the step of:
  dynamically altering the presentation of said graphical display of said hierarchical tree to reflect a user-determined distance constraint value, in response to user-controlled alteration of said graphical position of a threshold indicator of a plurality of threshold indicators.

14. The method for dynamically representing cluster analysis results according to claim 1, said step of dynamically altering the presentation of said graphical display of said hierarchical tree, further comprising the step of:
  dynamically altering the presentation of said graphical display of said hierarchical tree representing
  dynamically altering the presentation of said graphical display of said hierarchical tree representing cluster analysis of relationships between a plurality of web page topics, in response to user-controlled alteration of said graphical position of said threshold indicator.

15. A system for dynamically representing cluster analysis results, said system comprising:
  means for graphically displaying a hierarchical tree representing cluster analysis.of relationships between a plurality of items utilizing an initial distance constraint value, wherein said graphical display includes a graphically alterable threshold indicator positioned within said hierarchical tree that graphically marks said distance constraint value; and
  means for dynamically altering the presentation of said graphical display of said hierarchical tree to reflect a user-determined distance constraint value, in response to user-controlled alteration of said graphical position of said threshold indicator, such that upon changing a distance constraint for a cluster analysis, said hierarchical tree which graphically represents said cluster analysis is dynamically altered.

16. The system for dynamically representing cluster analysis results according to claim 15, said means for graphically displaying a hierarchical tree, further comprising:

means for graphically distinguishing each group of a plurality of groups designated from each point at which said threshold indicator intersects with said hierarchical tree.

17. The system for dynamically representing cluster analysis results according to claim 16 said means for graphically distinguishing each group of a plurality of groups designated from each point at which said threshold indicator intersects with said hierarchical tree, further comprising:

means for graphically altering the background color of each of said plurality of groups such that graphically distinguishable background colors alternate between adjacent groups of said plurality of groups.

18. The system for dynamically representing cluster analysis results according to claim 16 said means for graphically distinguishing each group of a plurality of groups designated from each point at which said threshold indicator intersects with said hierarchical tree, further comprising:

means for graphically adjusting the distance between said groups of items graphically displayed for each adjacent group of said plurality of groups.

19. The method for dynamically representing cluster analysis results according to claim 18, said method further comprising the step of:

altering said presentation of said graphical display of said hierarchical tree representing cluster analysis relationships between a plurality of web page topics to select a particular number of groups of topics displayed, in response to user-controlled alteration of said graphical position of said threshold indicator.

20. The system for dynamically representing cluster analysis results according to claim 15 said means for graphically displaying a hierarchical tree, further comprising:

means for graphically displaying a hierarchical tree representing cluster analysis of relationships between a plurality of items utilizing a plurality of distance constraint values, wherein said graphical display includes a plurality of graphically alterable threshold indicators that can be positioned within said hierarchical tree to graphically mark each of said plurality of distance constraint values.

21. The system for dynamically representing cluster analysis results according to claim 20, said means for graphically displaying a hierarchical tree, further comprising:

means for graphically distinguishing each group of a plurality of groups designated from each point at which a first threshold indicator intersects with said hierarchical tree; and means for graphically distinguishing each subgroup of a plurality of subgroups designated from each point at which a subsequent threshold indicator intersects with said hierarchical tree.

22. The system for dynamically representing cluster analysis results according to claim 21, said means for graphically distinguishing each group of a plurality of groups designated from each point at which a first threshold indicator intersects with said hierarchical tree and graphically distinguishing each subgroup of a plurality of subgroups designated from each point at which a subsequent threshold indicator intersects with said hierarchical tree, further comprising:

means for graphically altering the background color of each of said plurality of groups such that graphically distinguishable background colors alternate between adjacent groups of said plurality of groups; and means for graphically altering the display color of each of said plurality of graphically displayed items such that graphically distinguishable display colors alternate between adjacent subgroups of said plurality of subgroups.

23. The system for dynamically representing cluster analysis results according to claim 21, said means for graphically distinguishing each group of a plurality of groups designated from each point at which a first threshold indicator intersects with said hierarchical tree and graphically distinguishing each subgroup of a plurality of subgroups designated from each point at which a subsequent threshold indicator intersects with said hierarchical tree, further comprising:

means for graphically adjusting the distance between said items graphically displayed for each adjacent group of said plurality of groups; and means for graphically adjusting the distance between said items graphical displayed for each adjacent subgroup of said plurality of subgroups.

24. The system for dynamically representing cluster analysis results according to claim 16, said means for graphically displaying a hierarchical tree, further comprising:

means for graphically displaying a hierarchical tree representing cluster analysis of relationships between a plurality of web page topics, such that said graphically displayed hierarchical tree represents a web page hierarchy.

25. The system for dynamically representing cluster analysis results according to claim 16, said means for dynamically altering the presentation of said graphical display of said hierarchical tree, further comprising:

means for graphically distinguishing each group of a plurality of groups designated from each point at which said graphically positioned threshold indicator intersects with said hierarchical tree for a user-determined distance constraint value.

26. The system for dynamically representing cluster analysis results according to claim 25, said means for graphically distinguishing each group of a plurality of groups designated from each point at which said graphically positioned threshold indicator intersects with said hierarchical tree for a user-determined distance constraint value, further comprising:

means for graphically altering the background color of each of said plurality of groups such that graphically distinguishable background colors alternate between adjacent groups of said plurality of groups.

27. The system for dynamically representing cluster analysis results according to claim 25, said means for graphically distinguishing each group of a plurality of groups designated from each point at which said graphically positioned threshold indicator intersects with said hierarchical tree for a user-determined distance constraint value, further comprising:

means for graphically adjusting the distance between said items graphically displayed for each adjacent group of said plurality of groups.

28. The system for dynamically representing cluster analysis results according to claim 16, said means for dynamically altering the presentation of said graphical display of said hierarchical tree, further comprising:

means for dynamically altering the presentation of said graphical display of said hierarchical tree to reflect a user-determined distance constraint value, in response to user-controlled alteration of said graphical position of a threshold indicator of a plurality of threshold indicators.

29. The system for dynamically representing cluster analysis results according to claim 16, said means for dynamically altering the presentation of said graphical display of said hierarchical tree, further comprising:

means for dynamically altering the presentation of said graphical display of said hierarchical tree representing cluster analysis of relationships between a plurality of web page topics, in response to user-controlled alteration of said graphical position of said threshold indicator.

30. The system for dynamically representing cluster analysis results according to claim 29, said system further comprising:

means for altering said presentation of said graphical display of said hierarchical tree representing cluster analysis relationships between a plurality of web page topics to select a particular number of groups of topics displayed, in response to user-controlled alteration of said graphical position of said threshold indicator.

31. A program, residing on a computer usable medium having computer readable program code means, said program comprising:

means for enabling a graphical display of a hierarchical tree representing cluster analysis of relationships between a plurality of items utilizing an initial distance constraint value, wherein said graphical display includes a graphically alterable threshold indicator positioned within said hierarchical tree that graphically marks said distance constraint value; and means for processing a user-controlled alteration of said graphical position of said threshold indicator; and means for enabling an alteration of the presentation of said graphical display of said hierarchical tree to reflect said user-determined distance constraint value.

32. The program according to claim 31, said program further comprising:

means for enabling a graphical distinguishment of each group of a plurality of groups designated from each point at which said threshold indicator intersects with said hierarchical tree.

33. The program according to claim 32, said program further comprising:

means for enabling a graphical alternation of the background color of each of said plurality of groups such that graphically distinguishable background colors alternate between adjacent groups of said plurality of groups.

34. The program according to claim 32, said program further comprising:

means for graphically adjusting the distance between said groups of items graphically displayed for each adjacent group of said plurality of groups.

35. The program according to claim 31, said program further comprising:

means for enabling a graphicay display of a hierarchical tree representing cluster analysis of relationships between a plurality of items utilizing a plurality of distance constraint values, wherein said graphical display includes a plurality of graphically alterable threshold indicators that can be positioned within said hierarchical tree to graphically mark each of said plurality of distance constraint values.

36. The program according to claim 35, said program further comprising:

means for enabling a graphical distinguishment of each group of a plurality of groups designated from each point at which a first threshold indicator intersects with said hierarchical tree; and means for enabling a graphical distinguishment of each subgroup of a plurality of subgroups designated from each point at which a subsequent threshold indicator intersects with said hierarchical tree.

37. The program according to claim 36, said program further comprising:

means for enabling a graphical alteration of the background color of each of said plurality of groups such that graphically distinguishable background colors alternate between adjacent groups of said plurality of groups; and means for enabling a graphical alteration of the display color of each of said plurality of graphically displayed items such that graphically distinguishable display colors alternate between adjacent subgroups of said plurality of subgroups.

38. The program according to claim 36, said program further comprising:

means for enabling a graphical adjustment of the distance between said items graphically displayed for each adjacent group of said plurality of groups; and means for enabling a graphical adjustment of the distance between said items graphical displayed for each adjacent subgroup of said plurality of subgroups.

39. The program according to claim 31, said program further comprising:

means for enabling a graphical display of a hierarchical tree representing cluster analysis of relationships between a plurality of web page topics, such that said graphically displayed hierarchical tree represents a web page hierarchy.

40. The program according to claim 39, said program further comprising:

means for enabling a dynamic alteration of the presentation of said graphical display of said hierarchical tree representing cluster analysis of relationships between a plurality of web page topics, in response to user-controlled alteration of said graphical position of said threshold indicator.

41. The program according to claim 39, said program further comprising:

means for altering said presentation of said graphical display of said hierarchical tree representing cluster analysis relationships between a plurality of web page topics to select a particular number of groups of topics displayed, in response to user-controlled alteration of said graphical position of said threshold indicator.

* * * * *